United States Patent Office 3,452,906
Patented July 1, 1969

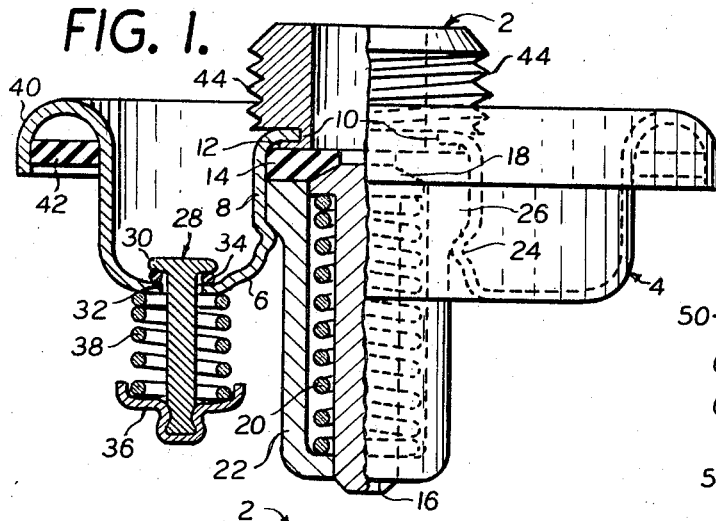
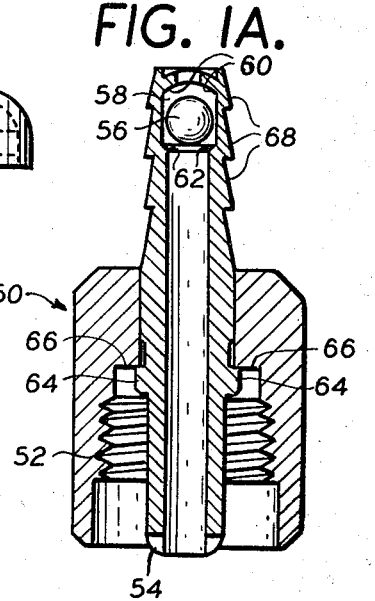
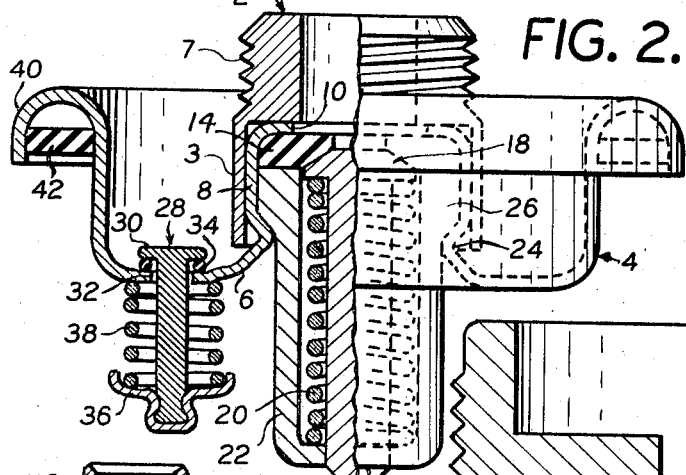
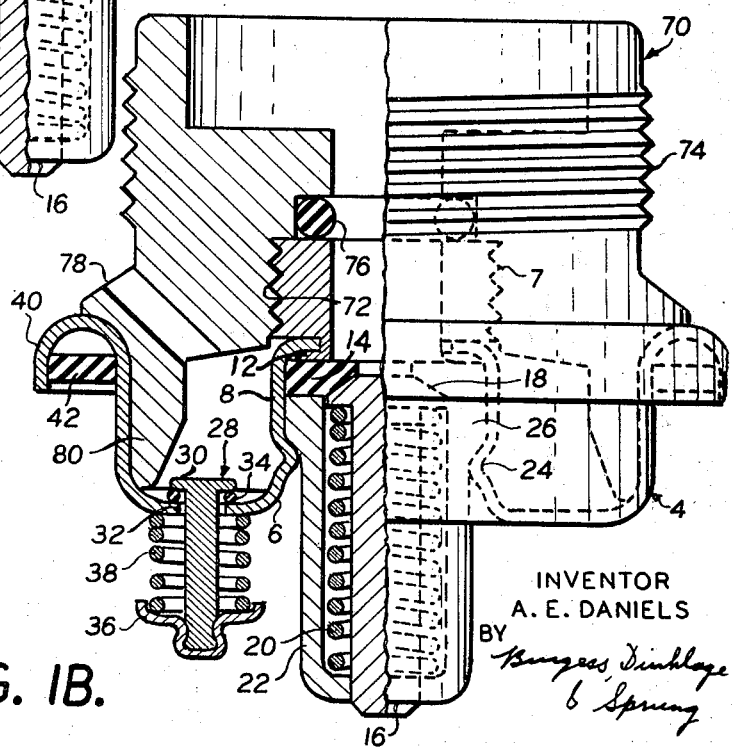

---

3,452,906
AEROSOL VALVE PEDESTAL BUSHING
Albert E. Daniels, Williamsville, N.Y., assignor to Impact Container Corporation, Alden, N.Y., a corporation of New York
Filed Dec. 29, 1965, Ser. No. 517,263
Int. Cl. B65d 83/14, 25/42; F16b 7/18
U.S. Cl. 222—402.1             5 Claims

ABSTRACT OF THE DISCLOSURE

A combination of a fluid container valve pedestal having an internal aperture with an inwardly directed flange on the aperture surrounding portion thereof; a bushing disposed within the aperture engaged and retained in a fixed relationship by the inwardly directed flange of the valve pedestal; a valve housing and a spring biased closed valve disposed within the valve pedestal and operatively associated with the bushing; a threaded outer surface is provided on the bushing retained on the pedestal and may be threadedly engaged with a larger bushing usable as a coupling to a valve actuator or directly threadedly engageable to a valve actuator; and a valve actuator threadedly engageable on the first mentioned bushing to hold the valve open against the spring bias.

---

The present invention relates to a method and apparatus for the modification of a valve used for dispensing a pressurized fluid from a container. More specifically, this invention relates to a bushing for a pressurized container valve pedestal such as an aerosol valve pedestal bushing.

Some difficulties have been encountered in transferring a fluid under pressure from a container into a secondary unit or body. For example, hose means have been attached to dispensing valves associated with pressurized fluid containers for the purpose of discharging an inflating and/or sealing fluid into a pneumatic device such as a tire. Before the tube could be attached, a thermoplastic adapter made of either high or low density polyethylene was inserted into the valve pedestal and held in place by a friction-fit. This adapter was designed to engage the container valve in a sealing arrangement by means of a friction-fitting tube, secured to, extending through and concentric with the adapter. The opposite end of this tube was attached to a hose by means of metallic thread means on the end of the hose, which were used to cut threads in the tube when a screwing connection was made between the tube and hose. Means for depressing and opening the container valve were also activated when the tube and hose were connected. In attaching the hose to the plastic valve adapter, numerous difficulties have occurred, such as cross-threading of the adapter and leaking of the fluid in the area of the container valve connection to the adapter. Difficulty was also encountered in the final removal of the spout and pressurized fluid container from the pneumatic device valve. Furthermore, the prior art methods and apparatus for dispensing such fluids is particularly difficult to adapt to transferring such pressurized fluids into dual truck tire valves.

It is therefore an object of the present invention to overcome these and other difficulties encountered in the prior art. It is a further object of this invention to provide a method and means for attaching a tube to a dispensing valve associated with a pressurized fluid container. It is a further object of this invention to provide a method and apparatus for connecting a pressurized fluid container to a pneumatic device such as a tire to avoid cross threading of the valve on such a device, and yet prevent leaking between the container, connecting means and pneumatic device. It is a further object of this invention to provide a method for facilitating removal of such pressurized fluid container from a pneumatic device and to provide for the transfer of fluids in such containers to a dual truck tire valve.

These and other objects have been accomplished by the method and apparatus of the present invention and will be more fully understood by reference to:

FIGS. 1, 1A and 1B, wherein a bushing is shown attached to a valve pedestal assembly used for dispensing the contents of a pressurized fluid container along with valve depressing and connecting means.

FIG. 2 shows an alternate embodiment of the valve pedestal bushing.

FIG. 3 illustrates an alternate embodiment of the present invention, in which a second bushing is shown attached to the valve pedestal bushing.

In one embodiment of the present invention, in FIG. 1, a pedestal valve bushing 2 is illustrated inserted in valve pedestal 4 through an aperture 6 having walls comprising a neck-like extension 8 that extend upwardly and inwardly, thereby forming a flange-like opening 10. The valve pedestal bushing 2 has a corresponding flange arrangement 12 which extends downwardly and outwardly for engaging flange 10 of the valve pedestal assembly 4. The valve pedestal bushing may be attached to the valve assembly by welding or by an adhesive such as an epoxy or any other equivalent synthetic or natural resinous material or combination thereof well known in the adhesive art. It is important, however, that the bond formed between the valve assembly and the valve pedestal bushing be such so as to withstand a torque of at least one foot pound applied to the valve pedestal bushing. The valve pedestal bushing attached to the valve assembly in such a manner rests on a resilient member 14, which serves not only to form a tight seal between the bushing and the valve assembly, but also serves as a valve seat for receiving valve stem 16 with outwardly extending flanged valve face 18. Spring 20 engaging the bottom face of flange 18 forces valve 16 into a sealing arrangement with valve seat 14, the opposite end of this spring being supported by housing means 22, which also abuts member 14 and is sealed thereto by means of a crimp 24 on valve assembly 4 and a collar 26 on valve housing 22.

The valve pedestal 4 is inserted into an opening in a container for a pressurized fluid in such a manner so that valve housing 22 is inserted into the interior of the container. When the container is charged with a fluid under pressure, a pressure in addition to that supplied by spring 20 is exerted by the fluid on the bottom of flange 18 in the outer extremity of stem 16, so as to assure a tight seal between valve face 18 and valve seat 14. When this pressure becomes excessive, however, due to changes in temperature of the pressurized fluid in the container, a release valve 28 tends to operate automatically, so as to relieve any excessive pressure caused by heating or any other means.

Valve 28 having a flange-like projection 30 is inserted through hole 32 in valve assembly 4 and engages a resilient annular member 34 to provide a seal between the valve body and the valve. A spring receiving and valve engaging means 36 is secured to the bottom of valve 28, after spring 38 has been placed around the stem of valve 28. An excessive build-up of pressure in the pressurized fluid container acts on valve engaging and spring reseiving means 36, causing it to move upwardly, thereby breaking the seal between valve seat 30 and sealing member 34. The tension on spring 38 is adjusted, so that valve 16 will operate at any predetermined pressure.

Valve assembly 4 is mounted in a container for pressurized fluids by forming a seal between flange 40 of valve pedestal assembly 4 and the periphery 42 of an opening in the pressurized fluid container. The seal thus formed between the two members is effected in a manner well known in the art, so as to prevent any leakage of fluid between the valve assembly and the container. Valve face 18 may be opened by depressing it with valve depressing means, thereby permitting the passage of fluid under pressure from the container.

Connecting means 50 may be attached to the pedestal valve bushing by means of threads 44 on said bushing and corresponding thread means 52 on connecting means 50. Connecting means 50 also has a valve depressing and hollow transfer means 54 connected to and concentric therewith, which engages and depresses valve face 18 when means 50 is screwed onto bushing 2. Transfer member 54 passes through the opening of rubber valve seat 12 and also forms a fluid tight seal therewith in this operation. Thus, when member 50 is attached to bushing 2, valve depressing and transfer means 54 will move downwardly in an adjustable metering relationship with valve seat 14. The end of means 54 which does not engage valve 18 is fitted with a one-way ball valve 56 floating in chamber 58 of member 54 and which may alternately engage seats 62 and keeping means 60. Member 54 has collar means 64 arranged along its length to engage projections 66 on means 50. This arrangement assures that member 54 will always engage valve 18 when pressed downwardly into contact therewith. The check valve or one-way ball valve 56 prevents fluid flow of any material from keeping means 60 toward seat 62, but allows such flow in the reverse direction. Retaining means 68 allows a fluid-tight connection of a yieldable tube to hollow member 54, the opposite end of such tube being fitted with valve receiving means for coupling to a pneumatic tire in a fluid transfer relation. Valve depressing and connecting means 90 shown in FIG. 1B comprise a substantially one-piece member having hollow valve depressing and fluid transfer means 92 projecting from one end thereof for depressing valve 18. Threads 94 for engaging the threads 44 on the valve bushing in FIG. 1 assure a fluid-tight connection between depressing and connecting member 90 and the bushing 2; and by slowly rotating either or both members in the proper direction, projection 92 will move downwardly in an easily controlled manner so as to depress valve 18 in an adjustable metering relationship with valve shat 14 of member 4, and as such operates in substantially the same manner as the valve connecting and depressing means shown in FIG. 1A. In operating in such a manner, valve depressing and fluid transfer means 92 forms a fluid-tight seal with rubber valve seat 14, thereby avoiding the leakage problems encountered with the prior-art devices. Depressing and fluid transfer means 92 continues as a concentric tube 96 through the body of member 90 and terminates in a one-way ball valve or check valve chamber 98. Ball 100 is arranged to engage retaining member 102 with flow passages 104 engaging chamber 98 in a quasi sealing relationship, but allowing fluid to pass through passages 104. Ball 100 will also engage seat 106 when fluid is passed in a direction from member 102 towards such seat. Fluid, however, will not pass through the chamber in this direction. O-ring 108 is placed in back of valve receiving threads 110 which are designed to engage any dispensing or filling valve of a pneumatic or equivalent device such as automobile tires, truck tires, air springs or the like. Collar 112 is provided to fit over such valves to guide the same into engagement with threads 110. Collar 112 also serves to act as a sealing member when valve depressing and connecting means 90 is connected to a filling valve mounted on a pneumatic device by means of a tapered stem, the base of such stem being greater in diameter and circumference than the end thereof which terminates in a threaded valve means.

In an alternate embodiment of the invention, FIG. 2 illustrates a pedestal valve bushing 2 having a collar-like projection 3 extending downwardly and arranged at the periphery of the bushing, so as to fit over the neck-like extension 8 of the valve assembly 4. The pedestal valve bushing illustrated in FIG. 2 may be secured to neck-like member 8 by means of an adhesive, such as an epoxy or any other resinous adhesives well known in the art. The adhesive is selected so as to obtain a bond that will withstand at least one foot pound of torque applied to the valve pedestal bushing. The adhesive should also be chemically resistant to the fluids in the pressurized container. Welding may also be used in this respect. The balance of the features shown in this view are fully described in reference to FIG. 1.

FIG. 3 illustrates an additional embodiment of the invention, in which a bushing 70 screwingly engages pedestal valve bushing 2 by means of matched threads 8 and 72. Bushing 30 is also provided with thread means 74 provided on its outer extremity for receiving a tube or other suitable member for aiding in the dispensing of pressurized fluids. The bushing 70 is also sealed to bushing 2 through a resilient O-ring 76, which compresses as the bushing 70 is screwed downwardly onto the bushing 2. A vent 78 is provided in bushing 30 for release of any fluid escaping from safety valve 28. The lower extremities 80 of bushing 70 engage the outer walls of valve assembly 5, so as to provide a substantially fluid-tight seal. This arrangement substantially assures that any fluid escaping through valve 28 will pass necessarily through vent 78. The valve assembly and the bushing, as described herein, may be made of steel, aluminum, brass or any other suitable metal known in the art suitable for such an end. The secondary bushing 60 may also be made of such metals. Further with regard to the secondary bushing 70, the size of such bushing is usually adapted to correspond to bushings known in the art for the dispensing of materials such as propane, oxygen, helium, and also halocarbons such as trichloromonofluoromethane, dichlorodifluoromethane, monochlorodifluormethane, and equivalents, as well as aersol-type materials. The balance of the features shown in this figure are described in reference to FIG. 1.

Thus, there has been described a novel pedestal bushing for pressurized fluid containers and a method for securing said bushing to a valve assembly associated with a pressurized fluid container known in the art.

Although the invention has been described with reference to certain preferred embodiments, it is not intended that the novel apparatus and method be limited thereby, but that certain modifications thereof are to be included within the broad scope of the following claims.

What is claimed is:

1. The combination of a pressurized fluid container valve pedestal having an internal aperture and an inwardly directed flange on the aperture surrounding portion thereof; and a bushing having a spout receiving means therein and inwardly directed flange receiving means; wherein said flange and said flange receiving means are mated, whereby said pedestal and said bushing are retained in substantially fixed relationship therebetween, wherein said bushing is operatively associated with a valve at the end thereof opposite to said spout receiving means; which valve has a housing with a shoulder proximate the end thereof adjacent said bushing and wherein said shoulder is positioned between said pedestal flange and a shoulder on said pedestal directed inwardly from said aperture surrounding portion and spaced from said flange.

2. The combination claimed in claim 1, wherein said flange receiving means comprises the body of said bushing on one side and said valve housing on the other side thereof.

3. The combination claimed in claim 2, wherein said valve housing is operatively associated with said flange through packing.

4. The combination claimed in claim 1, wherein said valve is spring loaded.

5. The combination of a pressurized fluid container valve pedestal having an internal aperture and an inwardly directed flange on the aperture surrounding portion thereof; and a bushing having spout receiving means therein and inwardly directed flange receiving means; wherein said flange and said flange receiving means are mated, whereby said pedestal and said bushing are retained in substantially fixed relationship therebetween, wherein said valve pedestal is substantially truncated toroidal in shape with the inside circumference thereof having said flange means at one end and an inwardly directed shoulder thereon spaced from said flange means, a valve seat adjacent said flange, a valve housing adjacent said shoulder which valve seat and housing are adjacent to each other and maintained in intimate contact between said flange and said shoulder.

References Cited

UNITED STATES PATENTS

| | | | |
|---|---|---|---|
| 1,993,255 | 3/1935 | Baggett et al. | 222—567 X |
| 2,570,909 | 10/1951 | Benson et al. | 222—394 |
| 3,292,827 | 12/1966 | Frangos | 222—514 X |
| 1,997,858 | 4/1935 | Clawson | 285—362 |
| 2,305,286 | 12/1942 | Ward | 222—394 |
| 2,565,050 | 8/1951 | Smith | 222—394 |

FOREIGN PATENTS 939,441 10/1963 Great Britain.

ROBERT B. REEVES, *Primary Examiner.*

NORMAN L. STACK, *Assistant Examiner.*

U.S. Cl. X.R.

222—568; 287—20.3